A. E. L. SECQUEVILLE.
LUBRICATING BOLT FOR THE SPRING SHACKLES OF AUTOMOBILE VEHICLES.
APPLICATION FILED JUNE 17, 1920.
1,402,900.
Patented Jan. 10, 1922.
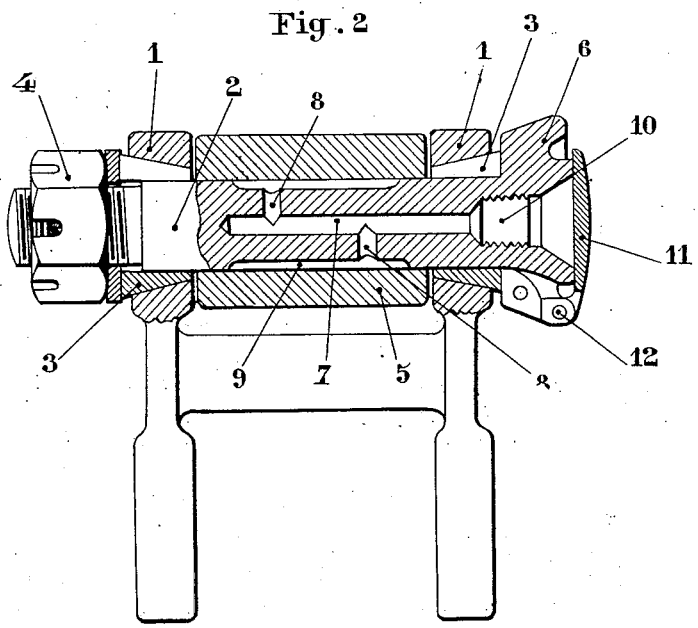
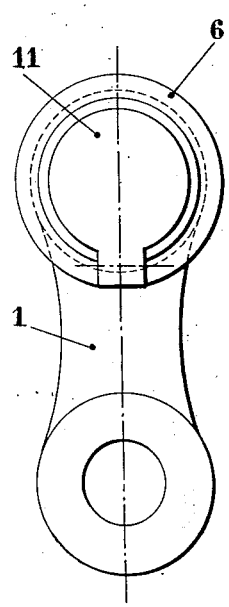
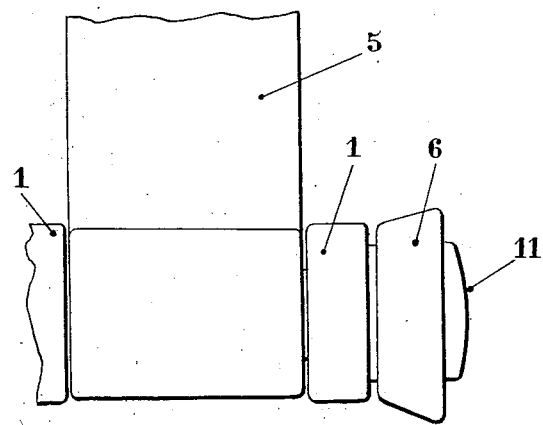
Inventor:
Alfred Ernest Léon Secqueville
By Lawrence Langner
Attorney.

UNITED STATES PATENT OFFICE.

ALFRED ERNEST LÉON SECQUEVILLE, OF GENNEVILLIERS, FRANCE, ASSIGNOR TO SOCIETE ANONYME DES ANCIENS ETABLISSEMENTS SECQUEVILLE AND HOYAU, OF GENNEVILLIERS, FRANCE.

LUBRICATING BOLT FOR THE SPRING SHACKLES OF AUTOMOBILE VEHICLES.

1,402,900.  Specification of Letters Patent. Patented Jan. 10, 1922.

Application filed June 17, 1920. Serial No. 389,714.

*To all whom it may concern:*

Be it known that I, ALFRED ERNEST LÉON SECQUEVILLE, a citizen of the French Republic, and residing at Gennevilliers, Seine, France, have invented certain new and useful Improvements in Lubricating Bolts for the Spring Shackles of Automobile Vehicles, of which the following is a specification.

The present invention has for its subject a lubricating bolt particularly applicable as the shackle bolt for springs of automobile vehicles. The invention is characterized by the provision of conical split rings mounted on the bolt of the spring in the plane of the shackles and by the particular construction of the lubricating bolt.

The conical split rings interposed between the bolt and the heads of the shackles are for the purpose of locking the bolt in the shackle by reason of their conical shape, the spring being free on the bolt.

The bolt of the spring forming a lubricating bolt performs particular functions adapted to facilitate the lubrication. It is furnished with a spring cover which closes the lubricating orifice in such a manner as to prevent the egress of the lubricant and the ingress of dust, dirt and water.

In the accompanying drawing is shown by way of example, a method of construction according to the invention.

Figure 1 is an elevation of the improved shackle.

Figure 2 is a section on the line I—I of Figure 1, and

Figure 3 is a plan view.

As will be seen in Figure 2, conical split rings 3 are mounted in the plane of the shackles between the heads 1 of the shackles and the body 2 of the bolts. By reason of the conical shape of these rings the bolt is locked in the shackles by tightening the nut 4 on the end of the bolt, thus preventing any play and consequently any uneven wear or tendency to become oval.

The spring 5 is mounted on the bolt 2 in the usual manner. The bolt, provided with a head 6 of reduced section, is pierced along its axis with a passage 7 communicating, in a well known manner by means of passages 8 with the reduced portion of the bolt or with a plurality of grooves 9. The head 6 forms a lubricator and in this portion the passage 7 is of larger diameter and screw threaded as at 10 so as to receive the nozzle of an injector for the lubricant by means of which the lubricant can be supplied to the interior of the bolt under pressure. A cap 11 hinged at 12 closes the opening in the bolt 6. A spring arranged in any suitable manner normally holds the cap 11 in the position shown in Figure 2.

The conical split rings forming the characteristic of the invention are also applicable to bolts and pivot shafts or axes of springs which are not lubricated, and whereby in a ring of greased asbestos or of ferodo, black leaded or coated with plumbago, is interposed between the steel rings mounted one upon the body of the bolt and the other upon the spring.

The part played by the conical split rings in this case is particularly important for, if the bolt is not locked in the heads of the shackles the bolts of the spring, without lubrication, cannot operate satisfactorily.

Having thus described my invention what I claim as new and desire to secure by Letters Patent is:—

The combination with a shackle having a plurality of eyes each with a conical aperture therein, of a bolt passing through said eyes, said bolt having an axial channel therein and passages leading from the axial channel to the outer surface of the bolt, the axial channel being enlarged at one end and screw threaded, a cap hinged to the bolt, means normally holding the cap closed, conical split rings fitting into the conical apertures and around the bolt, and means for tightening the conical split rings so as to lock the bolt in the shackle.

ALFRED ERNEST LÉON SECQUEVILLE.